US012791021B2

(12) United States Patent
Lucas et al.

(10) Patent No.: US 12,791,021 B2
(45) Date of Patent: Nov. 10, 2026

(54) CONTROLLED STOP OF AN ELECTRIC HYDRAULIC FRACKING PUMP

(71) Applicant: Halliburton Energy Services, Inc., Houston, TX (US)

(72) Inventors: Bruce Carl Lucas, Duncan, OK (US); Madhur Kohli, Houston, TX (US); Timothy Holiman Hunter, Duncan, OK (US); Kenneth Ray Coffman, Duncan, OK (US); Alan J. Corcoran, Houston, TX (US); Thomas Koutiti, Houston, TX (US); John Harold Fischer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/033,040

(22) Filed: Jan. 21, 2025

(65) Prior Publication Data

US 2026/0210349 A1 Jul. 23, 2026

(51) Int. Cl.

| | |
|---|---|
| ***F04B 49/02*** | (2006.01) |
| ***E21B 43/26*** | (2006.01) |
| ***F04B 17/03*** | (2006.01) |
| ***F04B 19/22*** | (2006.01) |
| ***H02P 3/18*** | (2006.01) |

(52) U.S. Cl.

CPC .......... *F04B 49/02* (2013.01); *E21B 43/2607* (2020.05); *F04B 17/03* (2013.01); *F04B 19/22* (2013.01); *H02P 3/18* (2013.01)

(58) Field of Classification Search

CPC .. H02P 3/18; H02P 27/06; H02P 23/20; H02P 23/0027; F04B 49/20; F04B 49/002

See application file for complete search history.

(56) References Cited

U.S. PATENT DOCUMENTS

| | | | | |
|---|---|---|---|---|
| 5,820,349 | A | 10/1998 | Caillat | |
| 9,764,633 | B1 | 9/2017 | Dorothy et al. | |
| 11,581,831 | B2 * | 2/2023 | Yan | B64D 31/12 |

(Continued)

FOREIGN PATENT DOCUMENTS

| | | | | |
|---|---|---|---|---|
| KR | 100848157 B1 | | 7/2008 | |
| KR | 20190059362 A | * | 5/2019 | F25B 49/025 |

(Continued)

OTHER PUBLICATIONS

Foreign Communication from Related Application—International Search Report and Written Opinion of the International Searching Authority, International Application No. PCT/US2025/016200, dated Oct. 14, 2025, 10 pages.

*Primary Examiner* — Thai T Dinh

(74) *Attorney, Agent, or Firm* — Conley Rose, P.C.; Rodney B. Carroll

(57) ABSTRACT

A method of stopping a reciprocating pump for hydraulic fracturing includes reducing speed of a motor in a first mode in which a speed demand is reduced over a first time period and a torque limit is held constant over the first time period; and further reducing speed of the motor in a second mode in which the speed demand is held constant over a second time period and the torque limit is reduced over the second time period. The motor comes to rest during or after the second time period. The motor is mechanically coupled to a reciprocating pump.

24 Claims, 6 Drawing Sheets

(56) References Cited

U.S. PATENT DOCUMENTS

| | | | | |
|---|---|---|---|---|
| 12,074,553 | B2 * | 8/2024 | Shampine | E21B 43/2607 |
| 2016/0208592 | A1 * | 7/2016 | Oehring | F04D 29/664 |
| 2018/0183363 | A1 * | 6/2018 | Sakamoto | H02P 3/12 |
| 2019/0273453 | A1 * | 9/2019 | Yan | H02P 3/14 |
| 2020/0109616 | A1 | 4/2020 | Oehring et al. | |
| 2021/0126651 | A1 * | 4/2021 | Chuang | H03M 13/1111 |

FOREIGN PATENT DOCUMENTS

| | | | |
|---|---|---|---|
| KR | 102356223 | B1 | 1/2022 |
| WO | 2017022626 | A1 | 2/2017 |

* cited by examiner

CONTROLLED STOP OF AN ELECTRIC HYDRAULIC FRACKING PUMP

BACKGROUND

During electric fracturing pumping operations when pumping is stopped, the electric drive power may be cut off instantaneously. The motor control may be erratic due to the dynamic conditions presented by the connected load. Pressure, which may be residual from the previous pumping operation, present from other pumps on the system, or residual in the well connected to the piping, may cause a rapid reverse torque on the pump, driveline and motor shaft. When drive power is removed, the motor may no longer produce positive torque. This may allow energy stored in the pump, driveline and motor shaft as twist to be rapidly released. The motor rotor may spin backwards until the pressure in the cylinders is adequate to stop the reverse momentum. Some of the reverse energy may be stored in the driveline when the rotor finally stops, which may cause the rotor to spin in the forward direction again. The oscillations may continue until the energy is fully dissipated. Each driveline reversal may cause slack in the gears of the pump speed reducer, which may cause collisions, potentially causing damage to the gears. Torque reversal fatigue cycles may cause damage to the driveline components. Additionally, the pump may continue to create positive flow with cylinder translation from rotation in either direction. In emergency stop situations, the added volume may raise the pressure in the output of the pump to exceed pressure limits. The system and method of the present disclosure may address one or more of these issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
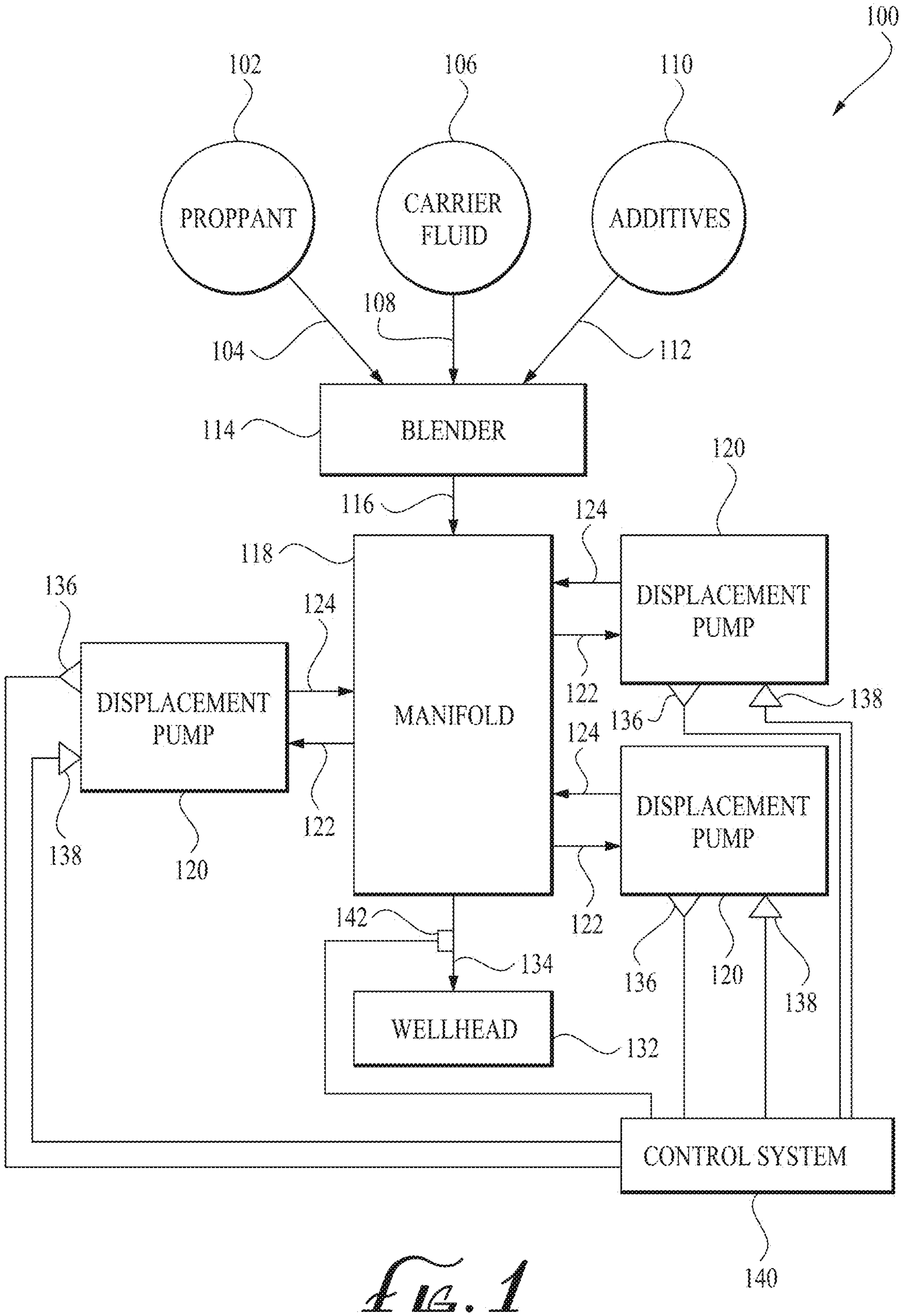
FIG. 1 is a schematic diagram of an exemplary wellbore servicing system, according to an embodiment of the present disclosure.

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein, the term “motor” is synonymous with “electric motor” and can be used interchangeably herein. The electric motor may be any device that converts electrical energy into mechanical energy. The electric motor may receive electric power from any power source. For example, the electric motor may receive electric power from a diesel generator, a power grid, another power source, or any combination thereof.

A method of stopping an electric pump for hydraulic fracturing may include reducing speed of a motor in a first mode in which a speed demand is reduced over a first time period and a torque limit is held constant over the first time period; and further reducing speed of the motor in a second mode in which the speed demand is held constant over a second time period and the torque limit is reduced over the second time period, wherein the motor comes to rest during or after the second time period, and wherein the motor is mechanically coupled to a reciprocating pump. This method of stopping an electric pump may reduce the severity of oscillations of the drive train of the pump as compared with an uncontrolled stop.

In some embodiments, the first mode is a speed control mode. In the speed control mode, the controller may regulate the rotational speed of the motor. The controller may adjust the frequency and/or voltage of the power supply to the motor. Current may be controlled indirectly to provide the necessary torque to maintain the target speed. The system may continuously monitor the motor’s speed and may adjust the voltage and/or frequency to comply with a speed demand. In some embodiments, the second mode is a torque control mode. In the torque control mode, the controller may regulate the current supplied to the motor. The voltage and/or frequency applied to the motor may be adjusted to maintain the required current that produces the desired torque output. Speed may be allowed to vary depending on the load and/or motor conditions. These examples are not intended to be limiting. In some embodiments, both speed and torque are controlled in both the first mode and the second mode. The first and second mode may merely be shorthand for adjustments to speed and/or torque control that are subsequently defined. Definitions may vary depending on the specific embodiment.

This method may be executed by a control system in communication with a variable frequency drive (VFD). The speed of a motor that drives a frac pump may be controlled by the VFD. A local controller on the VFD may receive/output rate setpoint commands and may determine or calculate motor current, motor voltage, actual motor speed and motor torque output values. The VFD may provide speed commands and available torque output values to the motor. A primary unit controller may transmit rate commands, based on user inputs and pressure transducers, to the main VFD controller. Thus, a stop command from the primary controller may drive the rate setpoint to zero rate. Pressure on the pump may produce a negative torque on the driveline, which may quickly decelerate the motor if drive power is removed. Rather than allowing the motor to coast down to zero speed, the driveline may be loaded by the reverse driveline force, which may quickly force the motor to stop. If uncontrolled, the driveline may cyclically unload until the energy is dissipated. The controlled torque release method of the present disclosure may be used to mitigate the torque reversals. The motor may be ramped down to low speed, and before cutting power to the motor, the motor available torque may be ramped down from full torque to zero torque over an expanded time interval. As the load torque exceeds the motor available torque, the motor may slip and the driveline may slowly rotate so that the torque limit is matched. In this manner, the torque release may be controlled as a slower reversal that may allow the energy to be dissipated in a way that mitigates or eliminate driveline oscillations, gear impacts, and additional pump rotations. The controlled torque release may be initiated as part of a stop command based on motor speed and motor torque conditions by the VFD controller.

The controlled torque release method of the present disclosure may comprise a series of steps in the control software to gradually release residual torque in the driveline to stop the motor against load. One or more frac pumps may be mechanically coupled to an electric motor through associated drivelines. The electric motor may be electrically connected to a variable frequency drive connected to an electric power source and a control system. The control system may be connected to various sensors configured to detect speed, temperature, pressure, torque, and/or position of the pump, motor, driveline and/or couplers. In some embodiments, motor speed and torque are estimated from voltage, current, and power quality values. In some embodiments, an encoder and/or speed sensor is disposed on the motor for speed reference. In some embodiments, a torque sensor and/or strain gauge is disposed on the driveline for torque reference.

Referring to FIG. 1, an exemplary wellbore servicing system 100 is shown. The wellbore servicing system 100 may be configured for fracturing wells in low-permeability reservoirs, among other wellbore servicing jobs. In fracturing operations, wellbore servicing fluids, such as particle laden fluids, may be pumped at high pressure downhole into a wellbore. The wellbore servicing system 100 may introduce particle laden fluids into a portion of a subterranean hydrocarbon formation at a sufficient pressure and velocity to form and extend fractures within the subterranean hydrocarbon formation. Proppants, such as grains of sand, may be mixed with the wellbore servicing fluid to keep the fractures open so that hydrocarbons may be produced from the subterranean hydrocarbon formation and flow into the wellbore. Hydraulic fracturing may create high-conductivity fluid communication between the wellbore and the subterranean hydrocarbon formation.

The wellbore servicing system 100 may include a blender 114 that is coupled to a manifold 118 (e.g., wellbore services manifold trailer) via a flowline or flowlines 116. The wellbore services manifold trailer may comprise a truck and/or trailer comprising one or more manifolds for receiving, organizing, and/or distributing wellbore servicing fluids during wellbore servicing operations. The manifold 118 may be coupled via outlet flowlines 122 and inlet flowlines 124 to positive displacement pumps 120. Outlet flowlines 122 may supply fluid to the pumps 120 from the manifold 118. Inlet flowlines 124 may supply fluid to the manifold 118 from the pumps 120. The manifold 118 may have manifold outlets from which wellbore servicing fluids flow to a wellhead 132 via one or more flowlines 134.

The blender 114 may mix solid and fluid components to achieve a well-blended wellbore servicing fluid. Sand or proppant 102, water or other carrier fluid 106, and additives 110 may be fed into the blender 114 via feedlines 104, 108, and 112, respectively.

The wellbore servicing system 100 may further comprises sensors 136 associated with the pumps 120 to sense and/or report operational information about the pumps 120. The wellbore servicing system 100 may further comprise pump control inputs 138 associated with the pumps 120 to allow selective variation of the operation of the pumps 120 and/or components of the pumps 120. Operational information about the pumps 120 may be communicated to a control system 140 by the sensors 136. Further, the pump control inputs 138 may be configured to receive signals, instructions, orders, states, and/or data sufficient to alter, vary, and/or maintain an operation of the pumps 120. The control system 140, sensors 136, and pump control inputs 138 may be configured so that each pump 120 and/or individual components of the pumps 120 are independently monitored and so that operations of each pump 120 and/or individual components of the pumps 120 may be independently altered, varied, and/or maintained. The wellbore servicing system 100 may further comprise a combined pump output sensor 142. The combined pump output sensor 142 may be associated with a flowline 134 that carries a fluid flow that results from the combined pumping efforts of all pumps 120. The combined pump output sensor 142 may be configured to monitor and/or report combined pump effect operational characteristic values to the control system 140. Alternatively, the combined output can be obtained by summing the output from individual sensors 136.

Figure 2:
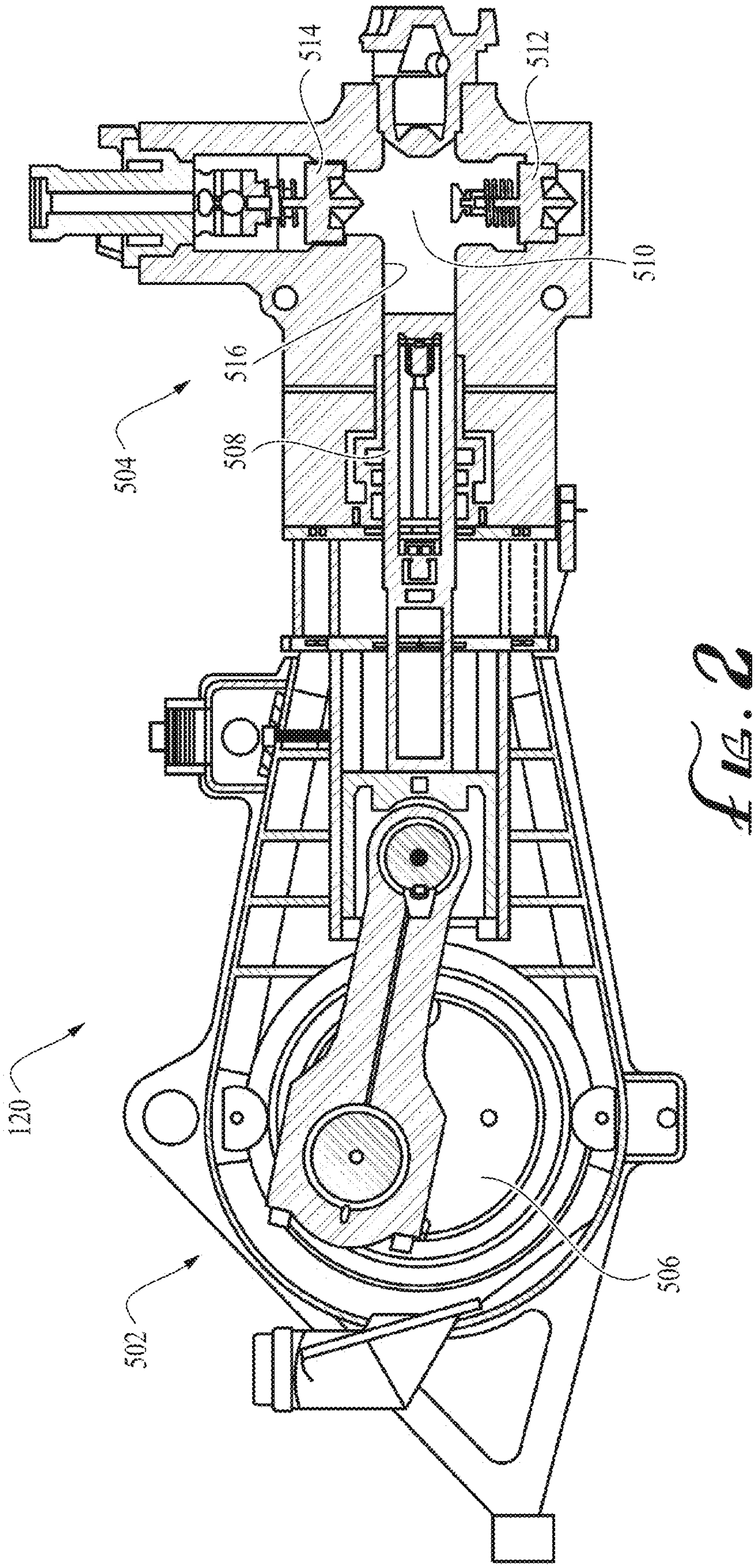
FIG. 2 is a cut-away view of an exemplary hydraulic fracking pump that can be driven by an electric motor, according to an embodiment.

Referring to FIG. 2, the pump 120 may comprise a power end 502 and a fluid end 504 attached to the power end 502. The power end 502 may comprise a crankshaft 506 that reciprocates a plunger 508 within a bore 516 of the fluid end 504. The fluid end 504 may further comprise a compression chamber 510 into which fluid flows through a suction valve 512. Fluid may be pumped out of the compression chamber 510 through a discharge valve 514 as the plunger 508 is moved toward the compression chamber 510.

Figure 3:
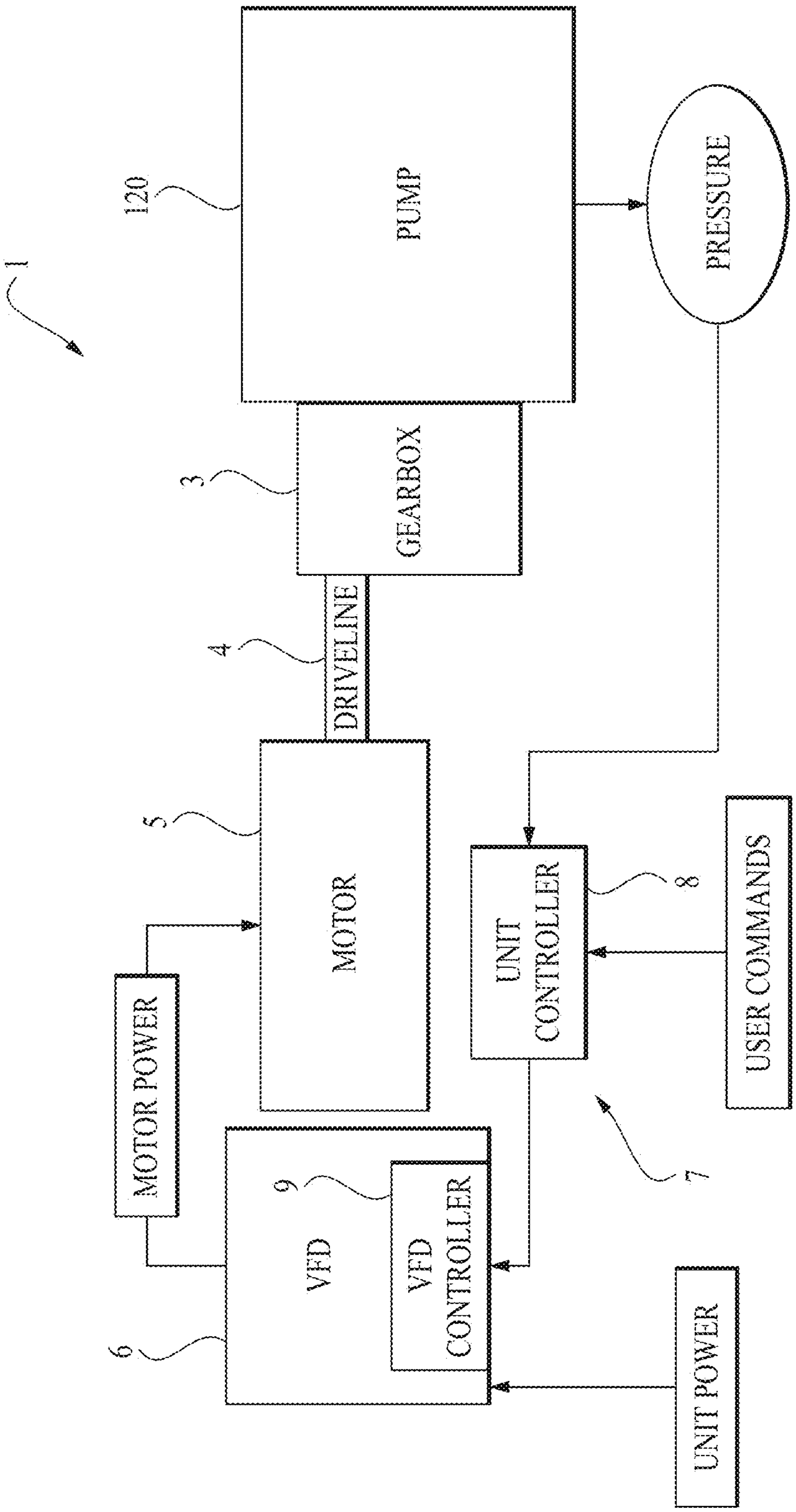
FIG. 3 is a schematic diagram of an exemplary electric hydraulic fracking system, according to an embodiment.

Referring to FIG. 3, an exemplary pumping system 1 for hydraulic fracturing is shown. The pumping system 1 may comprise a pump 120; a gearbox 3 mechanically coupled to the pump 120; a driveline 4 mechanically coupled to the gearbox 3; a motor 5 mechanically coupled to the driveline 4; a VFD 6 configured to provide power to the motor 5; and/or a control system 7 configured to, in response to receiving a stop command (e.g., a user command), control the VFD 6 to stop the motor 5 by reducing an available torque of the motor 5 over a time period. The reduction of the available torque of the motor 5 over the time period may comprise ramping down the available torque of the motor 5 to zero over the time period.

The control system 7 may include a first controller 8 (e.g., a unit controller) configured to transmit a rate command based on user input and data from a pressure transducer that is configured to measure pressure of the pump 120; and a second controller 9 (e.g., a VFD controller) configured to receive the rate command from the first controller, determine current limit, voltage, and frequency based on the rate commands, and control the VFD 6 according to the current limit, voltage, and frequency. The current limit may correspond to the torque limit, and the voltage and frequency may correspond to the speed demand. The first controller 8 may be configured to transmit a command of zero set point (e.g., a command to reduce the motor speed to zero in a controlled manner) to the second controller 9, in response to receiving an emergency stop command, and the second controller 9 may be configured to receive the command of zero set point, and reduce the available torque of the motor 5 to zero over the time period, in response to receiving the command of zero set point. The first controller 8 may be remote from the VFD 6, and the second controller 9 may be local to the VFD 6.

The control system 7 may be further configured to ramp down the available torque of the motor 5 by ramping down a current limit. The control system 7 may be further configured to measure speed of the motor 5 based on data from an encoder, and control the VFD 6 to reduce the available torque based on the measured speed of the motor 5. For example, the data from the encoder may provide information about the direction and speed of rotation that can be used to determine appropriate torque limits and speed demand over the remainder of the controlled stop. The encoder can directly provide signals to the VFD controller related to physical rotational behavior of the electric motor driven pumping system. The control system 7 may be further configured to reduce speed demand of the motor 5 before the time period, and hold the speed demand of the motor constant during the time period. That way, the motor 5 can be slowed down before performing the controlled stop, which may further reduce the maximum negative angular velocity of the driveline 4 during the controlled stop.

The time period of ramping down the available torque to the motor 5 may be at least 0.1 seconds. It may be, for example, one to five seconds, or 5 to 10 seconds, or 10 to 20 seconds. The ramp down may terminate concurrently with a speed demand of the motor 5 being set to zero or a practical lower speed from which the motor can be safely stopped without risk of damage. The available torque of the motor 5 being ramped down to zero over the time period may causes a slip of the motor 5 (e.g., the torque caused by fluid pressure inside the pump 120 may overcome the torque exerted by the motor 5). The available torque of the motor 5 being ramped down to zero over the time period may results in a torque exerted by the motor on the driveline 4 to at least temporarily match an opposing torque on the driveline 4 caused by fluid pressure on the pump 120 (e.g., at one or more points during the ramp down, the torque exerted by the motor 5 on the driveline 4 is equal to the torque exerted by the fluid on the driveline 4 via the pump 120).

Figure 4:
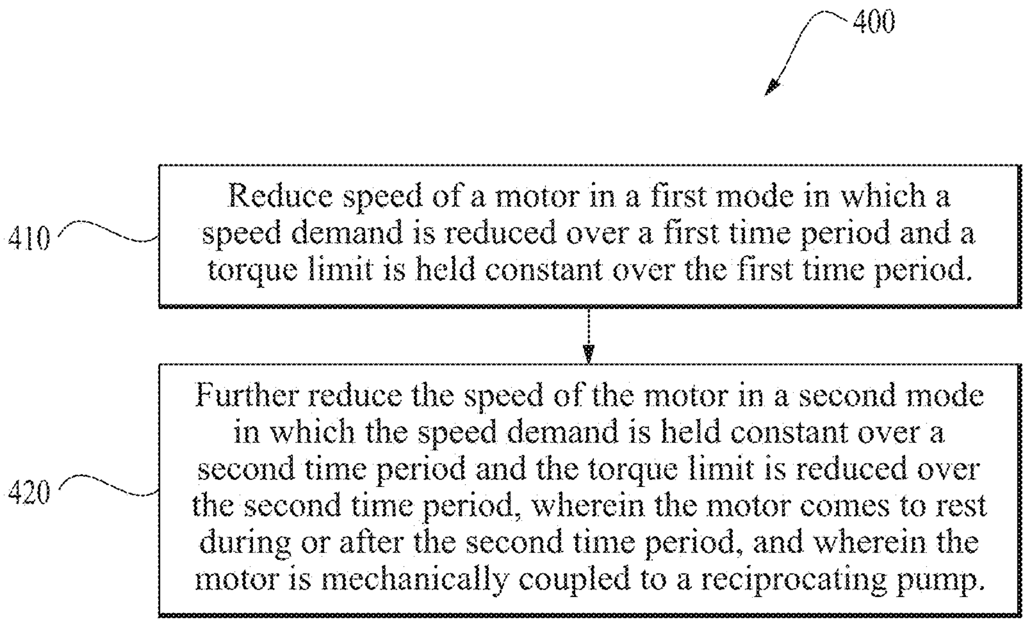
FIG. 4 is a flow diagram of an exemplary method of stopping an electric pump for hydraulic fracturing, according to an embodiment.

Referring to FIG. 4, a method 400 of stopping an electric pump for hydraulic fracturing may comprise the step 410 of reducing speed of a motor in a first mode in which a speed demand is reduced over a first time period and a torque limit is held constant over the first time period; and the step 420 of further reducing speed of the motor in a second mode in which the speed demand is held constant over a second time period and the torque limit is reduced over the second time period, wherein the motor comes to rest during or after the second time period, and wherein the motor is mechanically coupled to a reciprocating pump. The purpose of the first mode may be to reduce the speed of the motor without stopping it. The speed may be reduced but the torque exerted by the motor on the driveline may not be overcome by the torque exerted on the driveline in the opposite direction by the fluid pressure inside the pump. During the first mode there may not be any negative rotational velocity of the motor. The speed reduction during the first mode may reduce the maximum negative rotational velocity that occurs during the second mode by lowering the pressure inside the pump. The purpose of the second mode may be to fully stop the pump, although the full stop may be achieved some time after the second mode has ended. Holding the speed demand constant while reducing the torque limit may tend to reduce the maximum negative rotational velocity of the driveline because it may allow for a gentler process of balancing torque exerted by the motor on the driveline and torque exerted by the fluid on the driveline via the pump. The motor may still experience damped oscillations, but those oscillations may be less severe than in an uncontrolled stop.

The reducing of the speed demand may comprise reducing (e.g., ramping down and/or incrementally decreasing) either one or both of a frequency of electric power provided by the VFD to the motor and a voltage of the electric power provided by the VFD to the motor. The holding constant of the torque limit may comprise holding a current limit of the electric power provided by the VFD to the motor constant. The holding of the speed demand constant may comprise holding either one or both of the voltage and the frequency constant. The reducing of the torque limit may comprise reducing the current limit (e.g., ramping down and/or incrementally decreasing the current limit). The first time period may be before the second time period. The first time period may be longer than the second time period. There may be a gap between the first time period and the second period. The reducing of the torque limit may comprise setting the torque limit to less than a minimum torque required to drive the reciprocating pump, and ramping the torque limit down to zero, or a low limit from which power can be turned off without the risk of causing damage to components of the pumping system, after the setting of the torque limit. The minimum torque required to drive the reciprocating pump may be estimated by the controller based on sensor data. The reducing of the torque limit may comprise ramping the torque limit from a current (i.e. present) torque limit down to zero. The reducing of the available torque of the motor over the time period may comprise ramping down the available torque of the motor to a level below a required torque to drive the pump over the time period. The level may be zero, a threshold of potential equipment damage, or any other suitable level.

Figure 5:
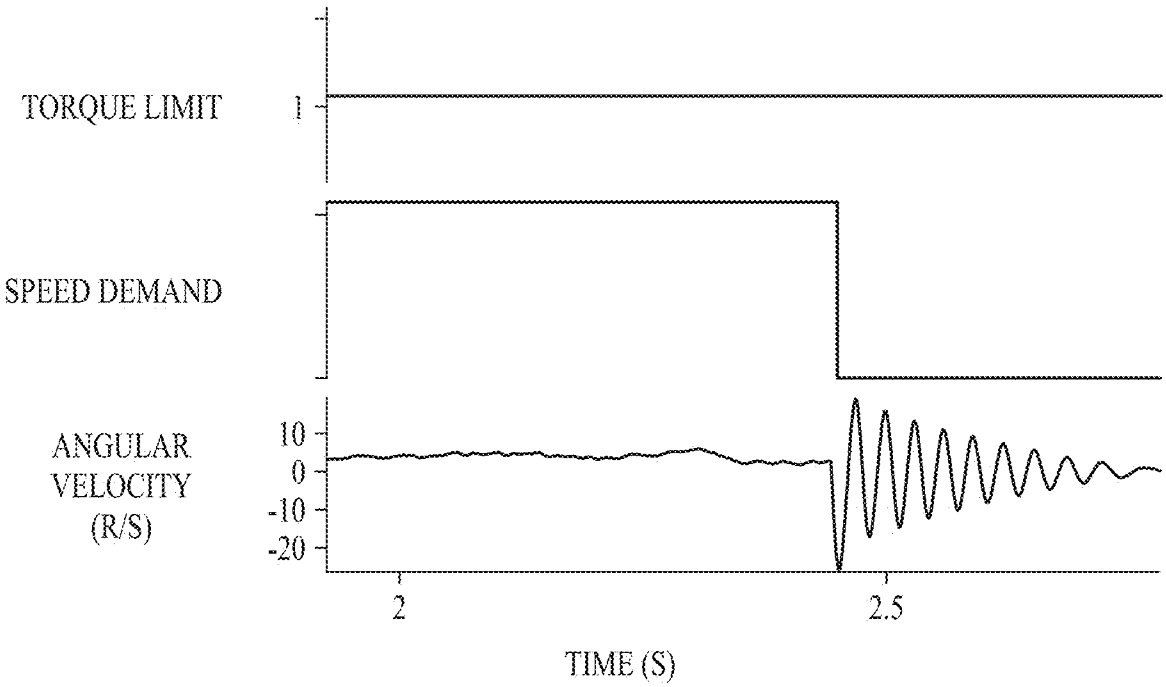
FIG. 5 is a graph of torque limit, speed demand, and motor speed over time during an uncontrolled stop, according to an embodiment.

Referring to FIG. 5, an exemplary graph of torque limit, speed demand, and angular velocity of the motor during an uncontrolled stop is shown. The torque limit may be constant during the time of the uncontrolled stop. Speed demand may be abruptly transitioned to zero (e.g., as a step function) to execute the uncontrolled stop. At the time that speed demand is brought to zero, angular velocity of the motor may oscillate. This may be because the output of the pump may not be constant because it may be a reciprocating (e.g., plunger) pump. When the pump is stopped, it may try to settle into to a valley of its output. Energy in the pump (e.g., caused by fluid dynamics inside the pump) may tend to sling the rotor backwards. The rotor can weigh 5,000 pounds, for example. The energy of compressed fluid in the pump cylinder can dissipate through drive train through reverse rotational motion. The pump plungers on the compression stroke may be pushed backwards. When the pump goes backwards, the pump plungers on the suction stroke may go into a compression stroke, which may push the pump forward. Friction may damp the motion. Thus, the uncontrolled stop can lead to persistent, high amplitude oscillations that can damage the drive train, speed reducer, gears, and/or power end of the pump.

Figure 6:
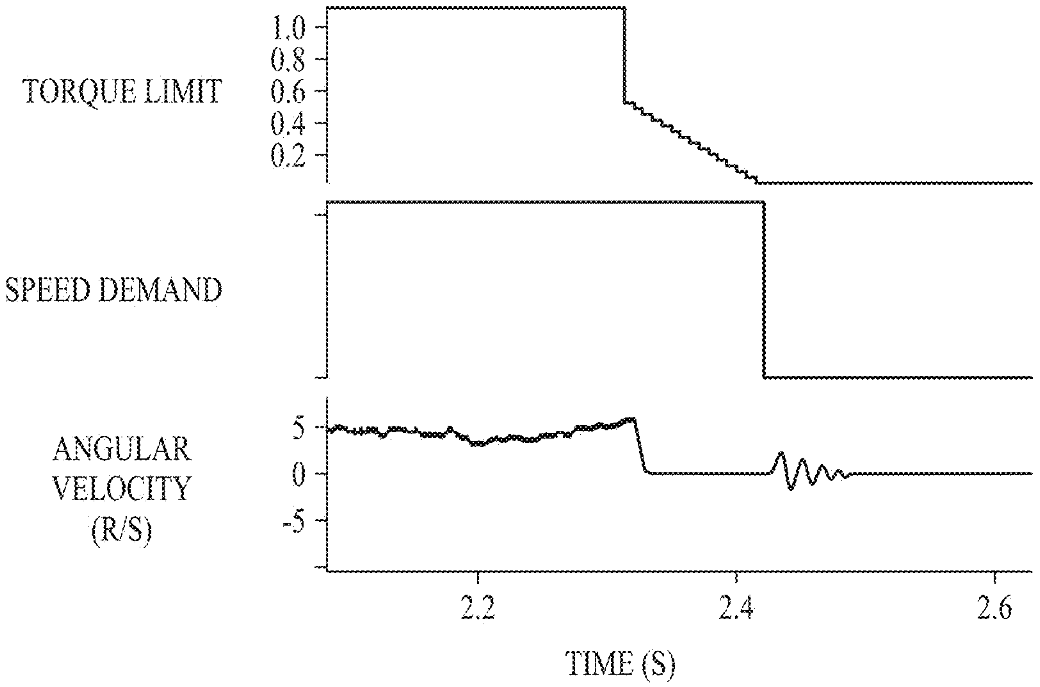
FIG. 6 is a graph of torque limit, speed demand, and motor speed over time during a controlled stop, according to embodiment.

Referring to FIG. 6, an exemplary graph of torque limit, speed demand, and angular velocity of the motor during a controlled stop is shown. Before the controlled stop, the torque limit and speed demand may be held constant. At the beginning of the controlled stop, the torque limit may be abruptly reduced to a fraction of its former value. After this initial reduction, the torque limit may be further reduced (e.g., ramped down) to, or near, zero. The ramp may be a smooth ramp or may comprise multiple steps. Other waveforms of reducing the torque limit such as parabolic or exponential decay are also within the scope of the present disclosure. At the time that the torque limit has reached zero, the speed demand may be abruptly brought to zero (e.g., via a step function). The torque limit may be brought to its previous value concurrently or after the speed demand is brought to zero. The angular velocity of the motor may oscillate at the time of the stop but the oscillations may be of lesser magnitude than those of the uncontrolled stop. By sending a torque limit command that is less than what is required to drive the pump forward, and then ramping down torque limit (e.g., sending torque limit commands of lesser and lesser quantities), the rotor may be arrested.

Although in the example shown in FIG. 6 the initial torque limit reduction is to 50 percent of the previous value, in some embodiments, the initial torque limit reduction is to 90 percent of the previous value (e.g., 80-95 percent). Torque limit during pumping may be set higher than the torque required to operate the pump. In this manner, the torque limit is a safety precaution to help prevent equipment damage and over-pressure event. In contrast, the required torque may be monitored by the control system 7 during pumping. This required torque may then be used to calculate the first step for controlled torque reduction to be used during a controlled stop. During a controlled stop, the torque limit may be changed to be lower than the required torque; this stops the motor and keeps forward driving torque on the driveline. This forward torque may then be relaxed by sequential reduction of the torque limit, down to zero, or a lower limit from which the motor power can be removed without risk of damage to the driveline and pumping system components. In some embodiments, the torque ramp down can take place over 1.75 seconds (e.g., 1-2 seconds or 0.5-4 seconds). In some embodiments, the specifics of the initial torque reduction and the torque ramp down can be based on measurements or estimations of torque required to drive the reciprocating pump forward. In some embodiments, the motor drives two pumps. Each pump could be, for example, a triplex or a quintuplex. Strokes of the two pumps can be offset to reduce overall tendency to drive back, which may further reduce the maximum velocity of the backwards rotation of the motor during the controlled stop.

Figure 7:
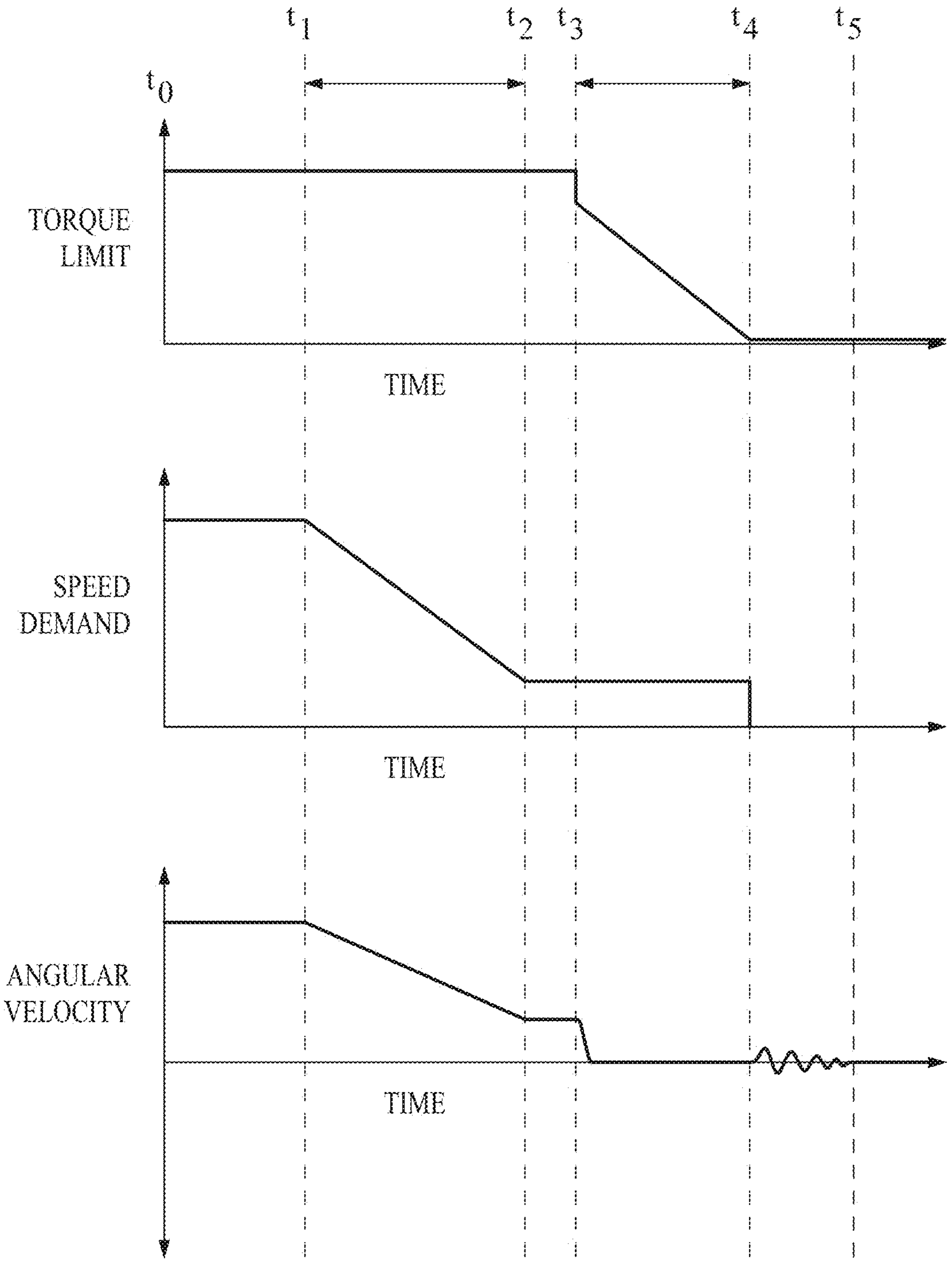
FIG. 7 is a graph of torque limit, speed demand, and motor speed over time during a controlled stop, according to another embodiment.

Referring to FIG. 7, an exemplary graph of torque limit, speed demand, and angular velocity of the motor during a controlled stop is shown. In the period between $t_0$ and $t_1$, the torque limit and the speed demand may be held constant. This may result in the motor speed being constant (e.g., during normal fracking operations). In the period between $t_0$ and $t_1$, the pump may be pumping at 16 barrels per minute (bpm), for example. In the period between $t_1$ and $t_2$, the speed demand may be reduced (e.g., ramped down). Although the reduction in speed demand is shown as being linear, in other embodiments, the reduction in speed demand can be parabolic, an exponential decay, or a step function. At $t_2$, the pump may be pumping at 0.5 bpm and/or 28 rpm and/or at a pressure of 12,000 psi. Between $t_2$ and $t_3$, torque limit and speed demand may be held constant. The motor speed may also be constant during this period. In some embodiments, this step of holding torque limit and speed demand constant is omitted. At $t_3$, torque limit may be sharply decreased (e.g., as a step function or a discontinuous function) to a fraction of its value during the period of $t_2$ to $t_3$. For example, the torque limit may be sharply reduced by ten percent. In the period from $t_3$ to $t_4$, the torque limit may be decreased (e.g., ramped down) and the speed demand may be held constant. The time from $t_3$ to $t_4$ may be for example, 3.4 seconds. Although this reduction in torque limit is shown as a ramp, in other embodiments, the reduction could be parabolic, an exponential decay, or a multi-step decrease. As used herein, the term "ramp down" encompasses all waveforms resembling a ramp, even if the waveform has non-linear aspects and/or is composed of multiple smaller steps that collectively form the ramp. In the period between $t_3$ and $t_4$, the angular velocity of the motor may oscillate and/or go below zero one or more times. Torque between $t_3$ and $t_4$ may be slowly relaxed, allowing the driveline to slowly rotate, typically backward, to a relatively relaxed condition. The oscillations may be damped by friction in the system. The torque on the motor could be, for example, within the range of −500 ft-lbs to 12,000 ft-lbs in the period between $t_3$ and $t_4$. At $t_4$, the speed demand may be abruptly brought to zero (e.g., with a step function or a discontinuous function). In some embodiments, after being reduced to zero or near zero, torque limit remains at that level. In other embodiments, at $t_4$, the torque limit is restored to its previous value (e.g., as it was at $t_0$). In other still embodiments, the torque limit is restored at a time after $t_4$. In the period of $t_4$ to $t_5$, the torque limit may be held constant and/or the speed demand may be held at zero. The damped oscillations of the motor may die out during this period. At $t_5$, the motor may be at rest.

As discussed previously herein, when an electric frac pump is disabled under pressure, there may be significant risk that the spring force in the drivelines will cause the motor to oscillate backwards and forwards until the energy is absorbed. These oscillations may be full torque reversals and may damage the drivelines, torque limiters, and/or teeth on speed reducer gears. The controlled torque release method of the present disclosure (e.g., reducing the torque limit and holding the speed demand constant) may prevent full torque reversals. The controlled torque release method may reduce damage and extend the life of pumps, drivelines and motors, thus reducing repair costs and down time. It may advantageously reduce the volume of fluid that is pumped after the pump disable command is received. The controlled torque release method may also reduce the peak pressure in emergency stop situations or in pressure testing where the volume is limited.

ADDITIONAL DISCLOSURE

The following are non-limiting, specific embodiments in accordance with the present disclosure:

In a first embodiment, a method of stopping a reciprocating pump for hydraulic fracturing comprises reducing speed of an electric motor in a first mode in which a speed demand is reduced over a first time period; and further reducing the speed of the motor in a second mode in which a torque limit is reduced over a second time period, wherein the motor comes to rest during or after the second time period, and wherein the motor is mechanically coupled to a reciprocating pump.

A second embodiment can include the method of the first embodiment, wherein the reducing of the speed of the electric motor in the first mode comprises reducing the speed demand by reducing either one or both of a frequency of electric power provided by a variable frequency drive (VFD) to the motor and a voltage of the electric power provided by the VFD to the motor.

A third embodiment can include the method of the first or second embodiments, wherein the reducing of the speed of the electric motor in the first mode further comprises holding the torque limit constant by holding a current limit of the electric power provided by the VFD to the motor constant.

A fourth embodiment can include the method of any of the first through third embodiments, wherein the further reducing of the speed of the electric motor in the second mode comprises holding the speed demand constant by holding either one or both of the voltage and the frequency constant.

A fifth embodiment can include the method of any of the first through fourth embodiments, wherein the further reducing of the speed of the motor in the second mode further comprises reducing the torque limit by reducing the current limit.

A sixth embodiment can include the method of any of the first through fifth embodiments, wherein the first time period is before the second time period.

A seventh embodiment can include the method of any of the first through sixth embodiments, wherein the reducing of the torque limit comprises setting the torque limit to less than a minimum torque required to drive the reciprocating pump, and ramping the torque limit down to zero after the setting of the torque limit.

An eighth embodiment can include the method of any of the first through seventh embodiments, wherein the reducing of the torque limit comprises ramping the torque limit from a current torque limit down to zero.

In a ninth embodiment, a pumping system for hydraulic fracturing comprises a pump; a gearbox mechanically coupled to the pump; a driveline mechanically coupled to the gearbox; an electric motor mechanically coupled to the driveline; a variable frequency drive configured to provide power to the motor; and a control system configured to, in response to receiving a stop command, control the variable frequency drive (VFD) to stop the motor by reducing an available torque of the motor over a time period.

A tenth embodiment can include the pumping system of the ninth embodiment, wherein the reduction of the available torque of the motor over the time period comprises ramping down the available torque of the motor to a lower limit below a required torque to drive the pump over the time period.

An eleventh embodiment can include the pumping system of the ninth or tenth embodiments, wherein the lower limit is zero.

A twelfth embodiment can include the pumping system of any of the ninth through eleventh embodiments, wherein the lower limit is below a threshold of potential equipment damage.

A thirteenth embodiment can include the pumping system of any of the ninth through twelfth embodiments, wherein the pump comprises a reciprocating pump.

A fourteenth embodiment can include the pumping system of any of the ninth through thirteenth embodiments, wherein the control system comprises: a first controller configured to transmit a rate command based on user input and data from a pressure transducer that is configured to measure pressure of the pump; and a second controller configured to receive the rate command from the first controller, determine current limit, voltage, and frequency based on the rate commands, and control the VFD according to the determined current limit, voltage, and frequency.

A fifteenth embodiment can include the pumping system of any of the ninth through fourteenth embodiments, wherein the first controller is further configured to transmit a command of zero set point to the second controller, in response to receiving an emergency stop command, and the second controller is further configured to receive the command of zero set point, and reduce the available torque of the motor to zero over the time period, in response to receiving the command of zero set point.

A sixteenth embodiment can include the pumping system of any of the ninth through fifteenth embodiments, wherein the first controller is remote from the VFD, and the second controller is local to the VFD.

A seventeenth embodiment can include the pumping system of any of the ninth through sixteenth embodiments, wherein the time period is at least 0.1 seconds.

An eighteenth embodiment can include the pumping system of any of the ninth through seventeenth embodiments, wherein the time period is one to twenty seconds.

A nineteenth embodiment can include the pumping system of any of the ninth through eighteenth embodiments, wherein the ramp down terminates concurrently with a speed demand of the motor being set to zero.

A twentieth embodiment can include the pumping system of any of the ninth through ninetieth embodiments, wherein the available torque of the motor being ramped down to zero over the time period causes a slip of the motor.

A twenty-first embodiment can include the pumping system of any of the ninth through twentieth embodiments, wherein the available torque of the motor being ramped down to zero over the time period results in a torque exerted by the motor on the driveline to at least temporarily match an opposing torque on the driveline caused by fluid pressure in the pump.

A twenty-second embodiment can include the pumping system of any of the ninth through twenty-first embodiments, wherein the control system is further configured to reduce the available torque of the motor by ramping down a current limit.

A twenty-third embodiment can include the pumping system of any of the ninth through twenty-second embodiments, wherein the control system is further configured to measure angular velocity of the motor based on data from an encoder, and control the VFD to reduce the available torque based on the measured angular velocity of the motor.

A twenty-fourth embodiment can include the pumping system of any of the ninth through twenty-third embodiments, wherein the control system is further configured to reduce a speed demand of the motor before the time period, and hold the speed demand of the motor constant during the time period.

In a twenty-fifth embodiment, a method of fracturing a wellbore penetrating a subterranean formation comprises pumping, by a reciprocating pump driven by an electric motor, fluid into the formation via the wellbore to form fractures in the formation; and stopping the pumping of the fluid by: reducing speed of the motor in a first mode in which a speed demand is reduced over a first time period; and further reducing the speed of the motor in a second mode in which the torque limit is reduced over the second time period, wherein the motor comes to rest during or after the second time period, and wherein the motor is mechanically coupled to a reciprocating pump.

A twenty-sixth embodiment can include the method of the twenty-fifth embodiment, wherein the stopping of the pump comprises decreasing pressure generated by the pump to below a pressure corresponding to a fracture pressure of the formation.

A twenty-seventh embodiment can include the method of the twenty-fifth or twenty-sixth embodiment, wherein the stopping of the pumping further comprises halting active fracturing of the formation.

A twenty-eighth embodiment can include the method of any of the twenty-fifth through twenty-seventh embodiments, further comprising resuming pumping after the halting of the active fracturing of the formation.

A twenty-ninth embodiment can include the method of any of the twenty-fifth through twenty-eighth embodiments, wherein the resuming of the pumping comprises continuing the active fracturing of the formation.

A thirtieth embodiment can include the method of any of the twenty-fifth through twenty-ninth embodiments, wherein the resuming of the pumping further comprises increasing the pressure generated by the pump to above the pressure corresponding to the fracture pressure of the formation.

A thirty-first embodiment can include the method of any of the twenty-fifth through thirtieth embodiments, wherein the reducing of the torque limit comprises ramping down the torque limit.

A thirty-second embodiment can include the method of any of the twenty-fifth through thirty-first embodiments, wherein the resuming of the pumping further comprises ramping up the speed demand and holding the torque limit constant.

A thirty-third embodiment can include the method of any of the twenty-fifth through thirty-second embodiments, wherein the first mode comprises a speed control mode, the second mode comprises a torque control mode, a transition from the speed control mode to the torque control mode occurs during the pumping of the fluid, speed of the pump is reduced via a variable frequency drive in the speed control mode, and the speed of the pump is further reduced via the variable frequency drive in the torque control mode.

In a thirty-fourth embodiment, a method of fracturing a wellbore penetrating a subterranean formation comprises pumping, by a reciprocating pump driven by an electric motor, fluid into the formation via the wellbore to form fractures in the formation; and stopping the pumping of the fluid by: controlling speed of the motor in a first mode over a first time period by sending one or more speed commands to a variable frequency drive (VFD) electrically coupled to the motor; and reducing the speed of the motor in a second mode, in which torque limit is reduced below a torque required to drive the motor, over a second time period, by sending one or more torque limit commands to the VFD, wherein the motor comes to rest during or after the second time period.

A thirty-fifth embodiment can include the method of the thirty-fourth embodiment, wherein the reducing of the speed of the motor comprises decreasing rotational velocity of the motor to zero.

A thirty-sixth embodiment can include the method of the thirty-fourth or thirty-fifth embodiments, further comprising maintaining a driveline of the motor in a static position by keeping the motor torque limit sufficiently high to counteract a torque on the driveline caused by fluid pressure in the pump.

A thirty-seventh embodiment can include the method of any of the thirty-fourth through thirty-sixth embodiments, wherein the maintaining of the driveline of the motor in the static position is performed after the reducing of the speed of the motor.

A thirty-eighth embodiment can include the method of any of the thirty-fourth through thirty-seventh embodiments, wherein the reducing of the torque limit is performed while restarting rotation of the motor.

A thirty-ninth embodiment can include the method of any of the thirty-fourth through thirty-eighth embodiments, wherein the reducing of the torque limit is part of an operation in which the motor drive system is completely shut down.

A fortieth embodiment can include the method of any of the thirty-fourth through thirty-ninth embodiments, wherein the stopping of the pumping of the fluid is initiated by a control system.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations. For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity.

Use of broader terms such as comprises, includes, having, etc. should be understood to provide support for narrower terms such as consisting of, consisting essentially of, comprised substantially of, etc. The use of terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. Any discussion of a reference herein is not an admission that it is prior art. Any disclosures of all patents, patent applications, and/or publications cited herein are hereby incorporated by reference, to the extent that they provide exemplary, procedural, or other details supplementary to those set forth herein.

As used herein, the term "or" does not require selection of only one element. Thus, the phrase "A or B" is satisfied by either one or both elements from the set {A, B}. A clause that recites "A or B" can be infringed with only one of the listed items, both of the listed items, multiples of the listed items, and one or both of the listed items and another item not listed. The phrase "A, B, or C" is satisfied by any one or any combination of any two or more from the set {A, B, C}. A clause that recites "A, B, or C" can be infringed with only one of the listed items, multiples of the listed items, and one or more of the items from the list and another item not listed.

As used herein, the article "a" means "one or more." As used herein, the article "an" means "one or more." As used herein, the article "the" when referring to a singular noun means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A method of stopping a reciprocating pump for hydraulic fracturing, comprising:
- reducing speed of an electric motor in a first mode in which a speed demand is reduced and a torque limit is held constant over a first time period; and
- further reducing the speed of the motor in a second mode in which the torque limit is reduced and the speed demand is held constant over a second time period,
- wherein the motor comes to rest during or after the second time period, and
- wherein the motor is mechanically coupled to the reciprocating pump.

2. The method of claim 1, wherein the reducing of the speed of the electric motor in the first mode comprises reducing the speed demand by reducing either one or both of a frequency of electric power provided by a variable frequency drive to the motor and a voltage of the electric power provided by the variable frequency drive to the motor.

3. The method of claim 2, wherein the reducing of the speed of the electric motor in the first mode further comprises holding the torque limit constant by holding a current limit of the electric power provided by the variable frequency drive to the motor constant.

4. The method of claim 3, wherein the further reducing of the speed of the electric motor in the second mode comprises holding the speed demand constant by holding either one or both of the voltage and the frequency constant.

5. The method of claim 4, wherein the further reducing of the speed of the motor in the second mode further comprises reducing the torque limit by reducing the current limit.

6. The method of claim 1, wherein the first time period is before the second time period.

7. The method of claim 1, wherein the reducing of the torque limit comprises setting the torque limit to less than a minimum torque required to drive the reciprocating pump, and ramping the torque limit down to zero after the setting of the torque limit.

8. The method of claim 1, wherein the reducing of the torque limit comprises ramping the torque limit from a current torque limit down to zero.

9. The method of claim 1, wherein the torque limit is held constant over the first time period by holding a current limit of electric power provided by a variable frequency drive to the motor constant.

10. The method of claim 1, wherein the speed demand is held constant over the second time period by holding either one or both of voltage and frequency of electric power provided by a variable frequency drive to the motor constant.

11. The method of claim 1, wherein the torque limit is held constant over the first time period by holding a current limit of electric power provided by a variable frequency drive to the motor constant, and wherein the speed demand is held constant over the second time period by holding either one or both of voltage and frequency of the electric power provided by the variable frequency drive to the motor constant.

12. A pumping system for hydraulic fracturing, comprising:
- a pump;
- a gearbox mechanically coupled to the pump;
- a driveline mechanically coupled to the gearbox;
- an electric motor mechanically coupled to the driveline;
- a variable frequency drive configured to provide power to the motor; and
- a control system configured to:
  - measure angular velocity of the motor based on data from an encoder; and
  - in response to receiving a stop command, control the variable frequency drive to stop the motor by reducing an available torque of the motor over a time period, based on the measured angular velocity.

13. The pumping system of claim 12, wherein the reduction of the available torque of the motor over the time period comprises ramping down the available torque of the motor to a lower limit below a required torque to drive the pump over the time period.

14. The pumping system of claim 13, wherein the lower limit is zero.

15. The pumping system of claim 13, wherein the lower limit is below a threshold of potential equipment damage.

16. The pumping system of claim 13, wherein the ramp down terminates concurrently with a speed demand of the motor being set to zero.

17. The pumping system of claim 13, wherein the available torque of the motor being ramped down to zero over the time period causes a slip of the motor.

18. The pumping system of claim 13, wherein
the control system is further configured to reduce the available torque of the motor by ramping down a current limit, and
the available torque of the motor being ramped down to zero over the time period results in a torque exerted by the motor on the driveline to at least temporarily match an opposing torque on the driveline caused by fluid pressure in the pump.

19. The pumping system of claim 12, wherein the pump comprises a reciprocating pump.

20. The pumping system of claim 9, wherein
the control system comprises:
a first controller configured to transmit a rate command based on user input and data from a pressure transducer that is configured to measure pressure of the pump; and
a second controller configured to receive the rate command from the first controller, determine current limit, voltage, and frequency based on the rate command, and control the variable frequency drive according to the determined current limit, voltage, and frequency,
the first controller is further configured to transmit a command of zero set point to the second controller, in response to receiving an emergency stop command,
the second controller is further configured to receive the command of zero set point, and reduce the available torque of the motor to zero over the time period, in response to receiving the command of zero set point,
the first controller is remote from the variable frequency drive, and
the second controller is local to the variable frequency drive.

21. The pumping system of claim 12, wherein the control system is further configured to reduce a speed demand of the motor before the time period, and hold the speed demand of the motor constant during the time period.

22. A method of fracturing a wellbore penetrating a subterranean formation, comprising:
pumping, by a reciprocating pump driven by an electric motor, fluid into the formation via the wellbore to form fractures in the formation, wherein the motor is coupled to the reciprocating pump by a driveline; and
stopping the pumping of the fluid by:
controlling speed of the motor in a first mode over a first time period by sending one or more speed commands to a variable frequency drive (VED) electrically coupled to the motor; and
reducing the speed of the motor in a second mode, in which a torque limit is reduced over a second time period by sending one or more torque limit commands to the variable frequency drive,
wherein the reducing of the speed of the motor in the second mode results in a torque exerted by the motor on the driveline to at least temporarily match an opposing torque on the driveline caused by fluid pressure in the reciprocating pump, and
wherein the motor comes to rest during or after the second time period.

23. The method of claim 22, wherein the reducing of the torque limit comprises ramping down available torque of the motor to a lower limit below a required torque to drive the reciprocating pump over the second time period.

24. The method of claim 23, wherein the ramping down of the available torque comprises ramping down a current limit.

* * * * *